March 13, 1934.    F. HEDLEY ET AL    1,950,611
LINEAR INDUCTION MOTOR
Original Filed Jan. 3, 1933
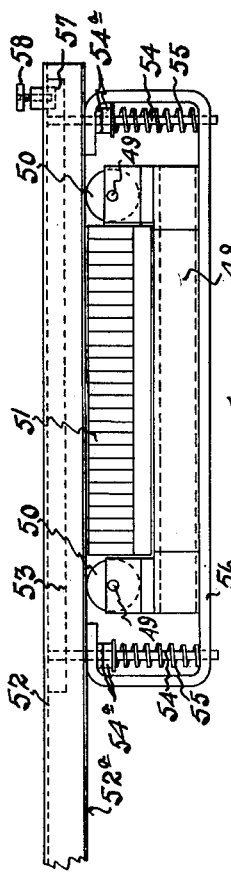
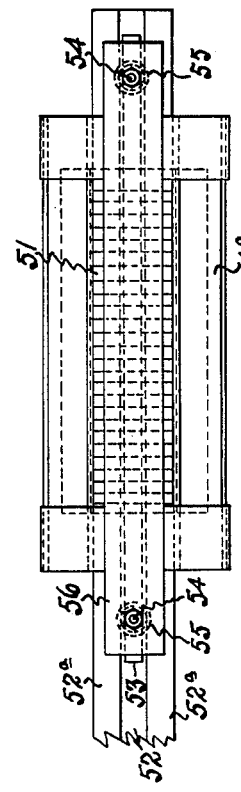
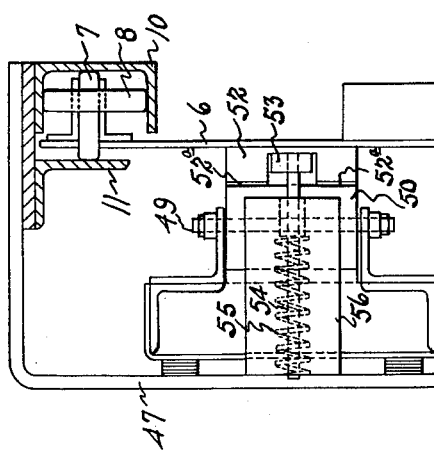
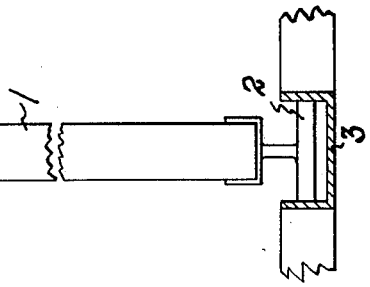
INVENTOR
Frank Hedley
James S. Doyle
BY
ATTORNEYS.

Patented Mar. 13, 1934

1,950,611

UNITED STATES PATENT OFFICE 1,950,611

LINEAR INDUCTION MOTOR

Frank Hedley, Yonkers, and James S. Doyle, Mount Vernon, N. Y.

Original application January 3, 1933, Serial No. 649,926. Divided and this application June 17, 1933, Serial No. 676,240

13 Claims. (Cl. 172—290)

This invention relates to improvements in linear induction motors, particularly of a construction to adapt them for use in operating doors and the like.

One of the objects of this invention is to provide a linear induction motor in which either the armature or the field may be mounted on the door and the armature or the field may be fixed with respect to the door.

A further object of this invention is to provide anti-friction means between the armature and field for maintaining a minimum air gap therebetween during operation.

A still further object of this invention is to provide a structure in which the armature or the field when supported adjacent the door may be relatively movable transversely of the plane of the door with respect to the field or armature when the motor is energized.

A still further object of this invention is to provide a brake and/or locking device for locking the motor and the object connected thereto against movement at one end of the motor stroke, and for braking the movement thereof near the end of its stroke in either direction.

A still further object of this invention is to provide a linear induction motor in association with the door in such a way that when the motor is closing the door it will continue to tend to close the door until it is fully closed and during such times as it meets with an obstruction in closing.

These and many other objects, as will appear from the following disclosure are secured by means of this invention.

This invention resides substantially in the combination, construction, arrangement and relative location of parts, all as will appear in greater detail in the following specification.

This application is a division of our copending application Serial No. 649,926, filed January 3, 1933.

Referring to the drawing,

Fig. 1 is an enlarged end elevational view with some parts in cross section of a door and the linear induction motor of this invention with a brake and locking mechanism applied thereto;

Fig. 2 is a top plan view of the motor and its mounting; and

Fig. 3 is a side elevational view of the motor.

This invention relates to improvements in linear motors which may be either of the alternating current induction type or the direct current type. The form of the motor as disclosed in the drawing is of the alternating current type. As is well known in the motor art, if the motor is of the direct current type it will be provided with a suitable commutator to progressively energize the windings thereof.

The basic object of the use of a motor of this type for operating doors, especially on transportation vehicles, is to simplify the equipment, to make it lighter in weight, and to reduce the cost thereof.

An advantage of this invention as applied to the doors of transportation vehicles is that the door may be made extremely light in weight with the result that it will not injure a person should it strike him in closing.

Another advantage of an arrangement of this type is that the only connection between the moving door and the driving force is represented by the magnetic flux between the field and the armature which is a yielding flexible force as applied to the door with the result that the door if it strikes a person in closing may stop without injury to the person or the apparatus. In addition, this force is always tending to close the door so that when the obstruction is removed it may proceed to full closed position.

A very important feature of a device of this type involves mechanism for securing and maintaining a minimum air gap between the field and the armature in order to insure maximum efficiency and force of which the design is capable in operating the door. In the present invention anti-friction means is provided to accomplish this purpose.

Since the connection between the door and the stator is represented only by the magnetic flux in the air gap, when the motor is deenergized the door is entirely free and for this reason it is important that some form of braking and locking device be provided to slow down and stop the door at the end of its stroke in either direction, and to lock the door in its closed position.

All of these important objects are secured by means of the structure of this invention which will now be described in detail.

There is shown in the drawing the motor of this invention in combination with a door to be operated thereby. The door is shown at 1, having at its bottom edge one or more anti-friction guide rollers 2 which operate in a fixed floor track 3. At the top of the door are provided hanger plates 6 to which are secured vertically and horizontally journaled anti-friction guide rollers 7 and 8 which operate in a guide track. In the drawing this guide track is shown made up from a U-shaped channel 10 and an angle bar 11 positioned to provide a guide track for the rollers 7 and 8. Members 10 and 11 are suitably supported in proper relation to the door on adjacent structure, as for example the car frame in the case of a vehicle.

At 48 is a casing secured to brackets 47 which are likewise supported over the door. Mounted in the casing 48 so as to be transversely slidable therein is the primary or field of the motor comprising a magnetizable core and suitable field windings diagrammatically illustrated at 51. This primary is of course preferably constructed of laminated magnetizable material and is provided in accordance with well known practice with suitable distributed windings so that when properly energized a linearly traveling magnetic field will be produced. As is well known if the motor is to be operated from a three phase circuit three sets of properly distributed windings are provided.

Likewise in accordance with alternating current motor principles the field may be properly energized with two phase and even single phase current in which case proper starting means may be provided. At 56 is a yoke which is attached to the brackets 47. Slidably mounted in the yoke 56 are the rods 54 which are surrounded by coil springs 55 lying between the yoke 56 and lock nuts 54ᵃ which are secured to the rods 54. These rods in turn are secured to the braking and locking bar 53 for movement therewith. This bar 53 fits in a longitudinal groove in the bar 52 which forms the armature bar and which is secured to the hanger plates 6. Secured to the face of the bar 52 are strips of metal 52ᵃ, preferably of aluminum, copper or the like. The bar 52 is made of a magnetizable metal which is energized when the field is energized. The magnetization of the bar 52 and the threading of the magnetic flux through the conductors 52ᵃ sets up eddy currents which produce reactionary magnetic forces on the field. The result is that if the magnetic force in the field travels linearly the bar 52 will be carried along, moving the door to which it is attached. The field core is provided near each end with spindles 49 on which the antifriction rollers 50 are journaled. These rollers contact with the strips 52ᵃ when the motor is energized and are proportioned to provide and maintain a minimum air gap between the stator and the armature bar. The braking and locking bar 52 is provided near one end with a notch 57 into which projects the end of an adjustable thumb screw 58, which is secured to the armature bar 52.

In the operation of this device when the field is energized it is drawn towards the armature bar by the magnetic field until the rollers 50 contact with the contacting strips 52ᵃ on the face of the armature bar, and is held there as long as the motor is energized. This transverse movement of the field core is permitted because of its slidable mounting in the fixed casing 48. At the same time the locking and braking bar 53, which is of a magnetizable metal is drawn towards the stator and out of contact with the armature bar 52. The field of the stator traveling linearly carries the armature bar with it, as well as the door. As the door approaches full open position the motor is deenergized by suitable automatically operating switching mechanism well known in the door control art. The result is that springs 55 which have been compressed force the bar 53 back into contact with the bar 52, thereby slowing the door down and bringing it to a stop. To close the door the field windings are energized to provide a reversely traveling field which closes the door, the bar 53 having been moved out of contact with the bar 52. As the door approaches the end of its stroke in the closing direction the motor is again deenergized with the result that the braking bar 53 engages the bar 52 to stop the motor. At the same time the thumb screw or latch bolt 58 engages the notch 57 in the bar 53, locking the door in closed position.

If the door in closing strikes an obstruction such as a person, it being light is readily brought to a stop without injury to the person and the mechanism. This result follows because the only connection between the door and its driving means is a magnetic field. With this arrangement it is possible to maintain the motor energized until the obstruction is removed, whereupon the door proceeds to closed position.

It is of course apparent to those skilled in the art that the field core and windings may be mounted on the door and the armature bar mounted on a support adjacent the door. Likewise, the anti-friction rollers which maintain a minimum air gap may be mounted on the armature bar, as well as on the field structure. Likewise, it is apparent that the field structure or the armature bar may be mounted on the door at either point, and may even be mounted along the bottom edge thereof.

It will also be apparent to those skilled in the art that with this construction a minimum air gap is always maintained during operation even though after considerable wear the door has a tendency to move transversely. Especially in the transportation field where the door and its operating mechanism are subjected to considerable wear, and abuse, this feature of automatically maintaining the most efficient air gap is quite important.

From the above description it will be apparent that this invention resides in certain principles of construction and operation which may be embodied in other physical forms of apparatus. We do not, therefore, desire to be strictly limited to the disclosure as given for purposes of illustration, but rather to the scope of the appended claims.

What we seek to secure by United States Letters Patent is:

1. A linear induction motor comprising a field structure, a longitudinally movable armature bar, and anti-friction means mounted on the field structure and engageable by the bar whereby when the field is energized the anti-friction means engages the bar to maintain a predetermined air gap.

2. A linear induction motor comprising a support, a field core and windings mounted thereon, an armature bar mounted adjacent thereto, and anti-friction means interposed between the field core and armature bar, the field core and armature bar being relatively movable rectilinearly in two direction at right angles to each other when the field core is magnetized.

3. A linear induction motor comprising a support, a field core and windings slidably mounted in the support, an armature bar and anti-friction means mounted to engage the bar when the field core is magnetized to create the force of attraction and movement between it and the rotor bar, the anti-friction means limiting the movement in one direction only.

4. A linear induction motor comprising a support, a magnetizable field core slidably mounted in the support, rollers mounted on the field core, and an armature bar positioned to be engaged by said rollers when the field core is magnetized.

5. A combination as described comprising an object to be moved, an armature bar mounted on said object, a magnetizable field core fixed with respect to said object, and anti-friction means interposed between the field core and armature bar so as to engage the bar when the field core is magnetized to maintain a minimum air gap.

6. A linear induction motor comprising a fixed support, a magnetizable field core movably mounted in the support, an armature bar positioned adjacent the field core, and a magnetizable member positioned to normally engage the bar whereby the magnetizable member is drawn out of contact with the bar when the field core is magnetized.

7. A combination as described comprising a magnetizable field core, an armature bar positioned adjacent the field core, a magnetizable braking bar positioned to engage the armature bar, and means for normally urging the braking bar into contact with the armature bar.

8. A combination as described comprising a magnetizable field core, an armature bar positioned adjacent the field core, a magnetizable braking bar positioned to engage the armature bar, means for normally urging the braking bar into contact with the armature bar, and locking means for locking the armature bar against movement, the locking means being released when the stator is magnetized.

9. The combination as described comprising a magnetizable field core fixed against longitudinal movement, a longitudinally movable armature bar positioned adjacent the field core, and a magnetizable braking and locking member positioned to engage the armature bar and to be withdrawn out of engagement therewith when the field core is magnetized.

10. A combination as described comprising a magnetizable field core, an armature bar, anti-friction means positioned therebetween to engage the armature bar, a magnetizable braking bar engaging the armature bar, and means for normally urging the braking bar into contact with the armature bar, the braking bar being withdrawn from contact with the armature bar when the field core is magnetized.

11. A combination as described comprising a magnetizable field core, an armature bar, anti-friction means positioned therebetween to engage the armature bar, a magnetizable braking bar engaging the armature bar, means for normally urging the braking bar into contact with the armature bar, the braking bar being withdrawn from contact with the armature bar when the field core is magnetized, and locking means released upon magnetization of the field core.

12. A combination as described comprising a magnetizable field core, an armature bar, anti-friction means positioned therebetween to engage the armature bar, a magnetizable braking bar engaging the armature bar, means for normally urging the braking bar into contact with the armature bar, the braking bar being withdrawn from contact with the armature bar when the field core is magnetized, and a locking member engaging the braking bar, the braking bar disengaging the locking means when the field core is energized.

13. The combination as described comprising a fixed field core, a movable armature bar positioned adjacent the field core and braking means for the armature bar movable out of braking engagement with the armature bar by the energization of the field core.

FRANK HEDLEY.
JAMES S. DOYLE.